(12) United States Patent
Li et al.

(10) Patent No.: US 10,542,581 B2
(45) Date of Patent: Jan. 21, 2020

(54) METHOD FOR MANAGING DISCONTINUOUS RECEPTION CYCLE, AND APPARATUS

(71) Applicant: Huawei Technologies Co., Ltd., Shenzhen (CN)

(72) Inventors: Zishuai Li, Xi'an (CN); Zhulin Cheng, Shenzhen (CN); Nan Zhao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 15/634,644

(22) Filed: Jun. 27, 2017

(65) Prior Publication Data

US 2017/0295608 A1  Oct. 12, 2017

Related U.S. Application Data

(63) Continuation of application No. PCT/CN2015/098116, filed on Dec. 21, 2015.

(30) Foreign Application Priority Data

Dec. 27, 2014 (CN) .......................... 2014 1 0834179

(51) Int. Cl.
*G08C 17/00* (2006.01)
*H04W 76/28* (2018.01)
(Continued)

(52) U.S. Cl.
CPC ....... *H04W 76/28* (2018.02); *H04W 52/0225* (2013.01); *H04W 80/04* (2013.01); *H04W 80/10* (2013.01); *Y02D 70/00* (2018.01)

(58) Field of Classification Search
CPC ............. H04W 76/28; H04W 52/0216; H04W 52/0225; H04W 52/02; H04W 80/04;
(Continued)

(56) References Cited

U.S. PATENT DOCUMENTS

2007/0259673 A1* 11/2007 Willars ............. H04W 52/0225
455/453
2008/0311903 A1  12/2008 Levin
(Continued)

FOREIGN PATENT DOCUMENTS

CN        101043753 A    9/2007
CN        101656978 A    2/2010
(Continued)

OTHER PUBLICATIONS

"VoIP Optimized DRX control", 3GPP TSG-RAN WG2#58, R2-071628. Kobe, Japan, 3rd Generation Partnership Project, Valbonne, France (May 7-11, 2007).
(Continued)

*Primary Examiner* — Chuong T Ho
(74) *Attorney, Agent, or Firm* — Leydig, Voit & Mayer, Ltd.

(57) ABSTRACT

The present invention relates to a technology for managing discontinuous reception (DRX). DRX cycles of different cycle lengths are configured according to service types of UE. If it is identified that the user equipment (UE) initiates a voice service, a relatively short first long DRX cycle is configured for the UE or the UE is instructed to deactivate DRX; and if it is identified that the UE does not perform a voice service, a relatively long second long DRX cycle is configured for the UE. The UE performs corresponding receiver on/off control according to the configured long DRX cycle, so as to receive downlink data or hibernate. According to the solution provided in the present invention, a DRX cycle of UE can be flexibly configured, so that a better balance between power consumption reduction of the UE and user experience improvement can be achieved.

14 Claims, 7 Drawing Sheets

(51) Int. Cl.
*H04W 52/02* (2009.01)
*H04W 80/04* (2009.01)
*H04W 80/10* (2009.01)

(58) Field of Classification Search
CPC ... H04W 80/10; Y02D 70/1262; Y02D 70/26; Y02D 70/23; Y02D 70/1242; Y02D 70/24; Y02D 70/00
USPC .......................................................... 370/311
See application file for complete search history.

(56) References Cited

U.S. PATENT DOCUMENTS

| | | |
|---|---|---|
| 2009/0258664 A1 | 10/2009 | Huan |
| 2010/0034127 A1 | 2/2010 | Iwamura et al. |
| 2010/0034145 A1 | 2/2010 | Kim et al. |
| 2010/0128646 A1 | 5/2010 | Gao |
| 2011/0141890 A1* | 6/2011 | Giaretta ............... H04W 28/20 370/232 |
| 2012/0046030 A1 | 2/2012 | Siomina et al. |
| 2012/0057569 A1 | 3/2012 | Xie et al. |
| 2012/0120828 A1 | 5/2012 | Anderson et al. |
| 2012/0120843 A1 | 5/2012 | Anderson et al. |
| 2013/0010751 A1 | 1/2013 | Rydnell et al. |
| 2015/0003254 A1 | 1/2015 | Sasaki et al. |
| 2015/0009874 A1* | 1/2015 | Edara ................ H04W 52/0225 370/311 |
| 2015/0124674 A1* | 5/2015 | Jamadagni ........ H04W 52/0216 370/311 |
| 2015/0351152 A1* | 12/2015 | Yuan .................... H04W 24/02 370/252 |

FOREIGN PATENT DOCUMENTS

| | | |
|---|---|---|
| CN | 103314633 A | 9/2013 |
| CN | 104039027 A | 9/2014 |
| EP | 2117136 A1 | 11/2009 |
| EP | 2266209 A1 | 12/2010 |
| EP | 2157830 B1 | 6/2017 |
| JP | 2008199222 A | 8/2008 |
| JP | 2010531563 A | 9/2010 |
| JP | 2012527793 A | 11/2012 |
| JP | 2013179415 A | 9/2013 |
| JP | 2014522150 A | 8/2014 |
| KR | 20090109089 A | 10/2009 |
| KR | 20100133470 A | 12/2010 |
| WO | 2009124806 A1 | 10/2009 |

OTHER PUBLICATIONS

"Smartphone Solutions White Paper," Issue 2.0, pp. 1-44, Huawei Tech. Co., Ltd., Shenzhen, China (Jul. 17, 2012).

* cited by examiner

METHOD FOR MANAGING DISCONTINUOUS RECEPTION CYCLE, AND APPARATUS

CROSS-REFERENCE TO RELATED APPLICATIONS

This application is a continuation of International Application No. PCT/CN2015/098116, filed on Dec. 21, 2015. The International Application claims priority to Chinese Patent Application No. 201410834179.0, filed on Dec. 27, 2014. The aforementioned patent applications are hereby incorporated by reference in their entireties.

TECHNICAL FIELD

This disclosure relates to the field of mobile communications, and in particular, to a discontinuous reception (DRX) technology in a wireless communications system.

BACKGROUND

A VoLTE (Voice over Long-Term Evolution (LTE)) technology is a voice solution based on an IP multimedia subsystem (IMS). The VoLTE technology can not only improve wireless spectrum utilization and reduce network costs of an operator, but also greatly improve user experience. After the VoLTE technology is used, a user waits a shorter time and enjoys a higher-quality and more natural audio and video call effect.

With widespread use of an intelligent terminal, to reduce power consumption of a terminal such as user equipment (UE), a discontinuous receive (DRX) technology is introduced. A DRX cycle indicates when the user equipment needs to monitor a channel and when the user equipment needs to be powered off to save battery power, so as to reduce unnecessary power consumption. It can be understood that, if the DRX cycle is relatively short, chances of scheduling the user equipment can be ensured, but frequent channel detection by the user equipment causes higher power consumption of the user equipment. If the DRX cycle is relatively long, power consumption of the user equipment can be effectively reduced, but paging for the user equipment can be responded by the user equipment only after an excessively long delay, and consequently system performance may deteriorate. Therefore, a solution of managing a DRX cycle is needed, to achieve a balance between system performance and power consumption of user equipment.

SUMMARY

This specification describes a method for managing a DRX cycle, an apparatus, and a system, to achieve a balance between system performance and power consumption of user equipment.

According to an aspect, an embodiment of the present invention provides a method for managing a DRX cycle. Current service types (for example, a voice service and a video on-live service) of user equipment are identified. DRX cycles of different cycle lengths are configured according to the service types of the user equipment. The user equipment receives paging according to a DRX cycle configured by a base station, for example, receiving downlink data or hibernating.

In a possible design, whether a current service type of the user equipment is a voice service (for example, a voice call service and a video service) is identified. If it is identified that the user equipment performs a voice service, a first long DRX cycle is configured for the user equipment or the user equipment is instructed to deactivate DRX. If it is identified that the user equipment does not perform a voice service, a second long DRX cycle is configured for the user equipment. A cycle length of the first long DRX cycle is shorter than a cycle length of the second long DRX cycle. According to the solution provided in this embodiment of the present invention, the DRX cycle of the user equipment can be flexibly managed. If the user equipment performs a voice service, a first long DRX cycle of a relatively short cycle length is configured for the user equipment, so that the user equipment responds to paging more quickly, and a delay is reduced. If the user equipment does not perform a voice service, a second long DRX cycle of a relatively long cycle length is configured for the user equipment, so that power consumption of the user equipment can be reduced as much as possible. Therefore, a better balance between delay reduction and power consumption reduction of the user equipment is achieved.

In a possible design, the identifying whether the user equipment performs a voice service can be performed by identifying whether the user equipment initiates the voice service. If the user equipment initiates the voice service, for example, initiates a call or is called, identification is performed as early as possible. For a user, when a voice call is initiated, whether a delay is long directly affects user experience. Therefore, identifying a voice call initiation time as early as possible and configuring a corresponding DRX cycle enable the user equipment to respond a voice service more quickly, thereby reducing a call delay and improving user experience.

In a possible design, a service type of the user equipment may be identified by identifying a Quality of Service (QoS) Class Identifier (QCI) bearer, thereby breaking a limit that the base station itself is unaware of data transmitted on the QCI bearer.

In a possible design, on the one hand, when the base station identifies the QCI bearer, the base station may only detect whether there is a data packet transmitted on the QCI bearer, without parsing content of the data packet. According to the design solution, a processing procedure of the base station can be simplified, and memory and central processing unit (CPU) resource consumption of the base station can be reduced. On the other hand, the base station may parse a data packet of data on a QCI bearer to learn the service type of the user equipment. According to this design solution, the base station can know more clearly a service status of the user equipment.

In a possible design, the base station may identify a signaling bearer of QCI=5. The signaling bearer of QCI=5 is a default IMS bearer and has a priority higher than that of another bearer. By identifying the bearer of QCI=5, the base station can participate in identification earlier when the user equipment performs various services, so that the base station can manage DRX more flexibly. For example, a voice call initiation event is identified by identifying the bearer of QCI=5.

In a possible design, the base station may parse a data packet on the signaling bearer of QCI=5. If detecting that a message transmitted on the signaling bearer of QCI=5 is a session initiation protocol (SIP) invite message or an acknowledgement response message for an SIP invite message, the base station identifies that the user equipment initiates a voice call or is called. if detecting that a message transmitted on the signaling bearing of QCI=5 is neither a SIP invite message nor an acknowledgement response for an SIP invite message, the base station identifies that the user equipment does not initiate a voice call or is not called. The SIP invite message is a message initiated earliest in a voice call initiation process. Parsing the message enables the base station to identify earlier that the user equipment has initiated a voice call.

Certainly, it can be understood that the base station may also parse another message on the bearer of QCI=5, so as to identify whether the user equipment performs a voice service.

In a possible design, the base station may identify, by detecting setup, activation, deactivation, or release of a bearer of QCI=1, whether the user equipment performs a voice service. For example, if the bearer of QCI=1 is set up or activated, it is identified that the user equipment performs a voice service. If the bearer of QCI=1 is deactivated or released, it is identified that the voice service of the user equipment ends.

In a possible design, a network entity in a core network or an IP multimedia subsystem IMS identifies whether the user equipment performs a voice service and notifies the base station of the information. For example, a network entity in an Evolved Packet Core (EPC) or IMS network sends a voice call setup and initiation indication to the base station to notify the base station that the user equipment performs a voice service. Optionally, the voice call setup and initiation indication may carry information about calling user equipment and/or called user equipment.

In a possible design, when or after the base station identifies that the user equipment initiates a voice service, the base station starts a timer; when the timer expires, the base station detects whether the bear of QCI=1 is successfully set up; and when the bearer of QCI=1 is successfully set up, the base station configures the first long DRX cycle for the user equipment or instructs the user equipment to deactivate the DRX. By setting the timer, the base station can avoid unnecessary reconfiguration of the long DRX cycle for the user equipment due to a setup failure of the bearer of QCI=1.

In a possible design, if identifying that the user equipment UE initiates a voice service, the base station instructs the user equipment to deactivate the DRX, if identifying that the voice service of the user equipment ends, the base station instructs the user equipment to activate the DRX, or configures the long DRX cycle of the relatively long cycle length for the user equipment and instructs the user equipment to activate the DRX.

In a possible design, the base station sends a radio resource control (RRC) connection message to the user equipment. The message carries one or more of the first long DRX cycle, the second long DRX cycle, an instruction used for instructing the user equipment to deactivate the DRX, or an instruction used for instructing the user equipment to activate the DRX that are mentioned in the foregoing designs. For example, the RRC message may be an RRC connection reconfiguration message.

In a possible design, the first and second long DRX cycles may be configured according to a possible value range, specified by a communications standard and protocol, of a long DRX cycle. For example, the first long DRX cycle is configured to a relatively small possible value (for example, a possible value of less than 80 subframes), and the second long DRX cycle is configured to a relatively large possible value (for example, a possible value of greater than or equal to 80 subframes).

In another possible design, the above-mentioned first and second long DRX cycles may be configured according to a quality of service (QoS) requirement of a corresponding service. For example, the first long DRX cycle is configured to possible duration of less than 80 milliseconds, and the second long DRX cycle is configured to possible duration of greater than or equal to 80 milliseconds.

According to another aspect, an embodiment of the present invention provides a base station, including a corresponding module configured to perform actions of the base station in the foregoing method designs. The module may be software and/or hardware.

In a possible design, the base station includes a processor and a memory. The processor is configured to support the base station to perform corresponding functions in the foregoing method. The memory is configured to be coupled to the memory and store a program instruction and data required by the base station.

According to still another aspect, an embodiment of the present invention provides user equipment, including a corresponding module configured to perform actions of the user equipment in the foregoing method designs. The module may be software and/or hardware.

In a possible design, a terminal includes a receiver and a processor. The receiver is configured to support the user equipment to receive a first long DRX cycle and a second long DRX cycle configured by the base station for the user equipment, and various instructions such as a DRX activation instruction or a DRX deactivation instruction. The processor controls the user equipment to receive paging according to the first long DRX cycle, the DRX deactivation instruction, or the second long DRX cycle that is received by the receiver.

According to yet another aspect, an embodiment of the present invention provides a network entity. The network entity may be a network entity in a core network, for example, a mobility management entity (MME) or a gateway (a serving gateway (SGW) and/or a packet data network gateway (PGW)). Alternatively, the network entity may be a network entity in an IP multimedia subsystem (IMS). The network entity is configured to identify a service type of user equipment and notify a base station of the identified user equipment service and other information, so that the network entity cooperates with the base station to implement the solutions in the foregoing method designs.

According to still yet another aspect, an embodiment of the present invention provides a communications system, where the system includes the base station and the user equipment, or the base station and the network entity, or the base station, the user equipment, and the network entity described in the foregoing aspects.

According to a further aspect, an embodiment of the present invention provides a computer storage medium, including a program, when executed by a computer, cause the computer to perform the foregoing aspects.

Compared with the prior art, a DRX cycle can be configured and managed more flexibly according to the solutions provided in the present invention.

DESCRIPTION OF EMBODIMENTS

The following describes an application scenario of the present invention and the technical solutions in the embodiments.

Figure 1:
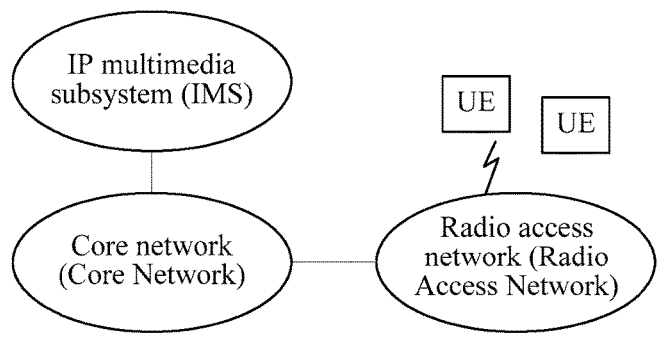
FIG. 1 is a schematic diagram of a possible application scenario according to embodiments of the present invention.

As shown in FIG. 1, a user equipment UE is connected to an IMS network through a radio access network (RAN) and a core network (CN). The technology described in the present invention may be applied to a Long Term Evolution (LTE) system, or other wireless communications systems that use various radio access technologies, for example, systems that use Code Division Multiple Access, Frequency Division Multiple Access, Time Division Multiple Access, orthogonal frequency division multiple access, single carrier frequency division multiple access, and other radio access technologies. In addition, the technology described in the present invention may be further applied to an evolved LTE system. For clear description, only an LTE system is used as an example herein. In the LTE system, an evolved Universal Mobile Telecommunication Service (UMTS) terrestrial radio access network (E-UTRAN) serves as a radio access network, and an evolved packet core (EPC) serves as a core network. The user equipment is connected to the IMS network through the E-UTRAN and the EPC.

In this application, nouns "network" and "system" are often used alternately, but a person skilled in the art can understand their meanings. User equipments UEs involved in the present invention may include a handheld device, an in-vehicle device, a wearable device, a computing device, or another processing device connected to a wireless modem, where the device has a wireless communication function, and various forms of user equipment (UE), mobile station (MS), terminal, terminal equipment (TE), and the like. For ease of description, in this application, the device is referred to as user equipment or UE. A base station (BS) involved in the present invention is an apparatus that is deployed in a radio access network and that is configured to provide a wireless communication function for user equipment. The base station may include various forms of macro base stations, micro base stations, relay stations, access points, and the like. In systems that use different radio access technologies, names of a device having a function of a base station may be different. For example, the device is referred to as an evolved NodeB (eNB or eNodeB) in an LTE network, referred to as a NodeB in a 3G network, or the like. For ease of description, in this application, the device is referred to as a base station or a BS.

Figure 2:
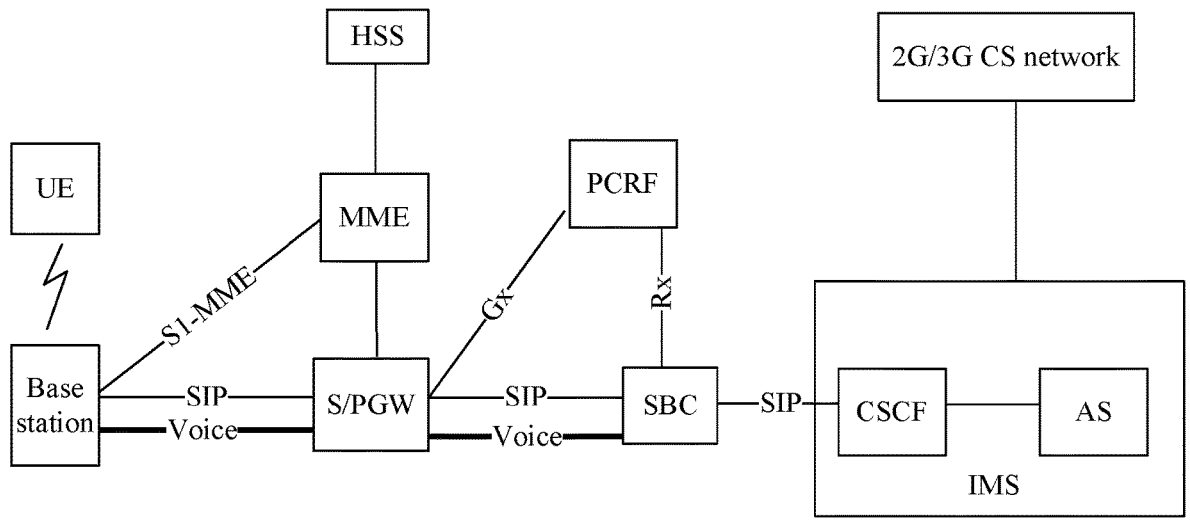
FIG. 2 is a schematic diagram of a possible system network according to embodiments of the present invention.

FIG. 2 shows a schematic diagram of a VoLTE network architecture according to an embodiment of the present invention. The VoLTE network architecture mainly includes an IMS network, a core network, an access network, and user equipment. The IMS network serves as a service control layer system, and the core network EPC serves as a bearer layer. With an IMS system, functions such as voice call control can be implemented, and further, charging can be performed flexibly and properly for a multimedia session.

The IMS network mainly includes a call session control function (CSCF), an application server (AS), session border controller (SBC), and the like. The IMS network cooperates with the EPC network to provide a voice service and its supplementary services that are similar to circuit-switched voice services, for example, call number display, call transfer, call waiting, and a conference call. The core network EPC mainly includes a mobility management entity, a serving gateway (SGW), a packet data network gateway (PGW), a policy and charging rules function (PCRF), and a home subscriber server (HSS). The access network mainly includes a base station. The user equipment supports VoLTE-related features, including an LTE DRX function, and the like.

In an LTE system, a series of processing procedures of DRX have been standardized by the 3rd Generation Partnership Project (3GPP) according to the 36.321 protocol.

Figure 3:
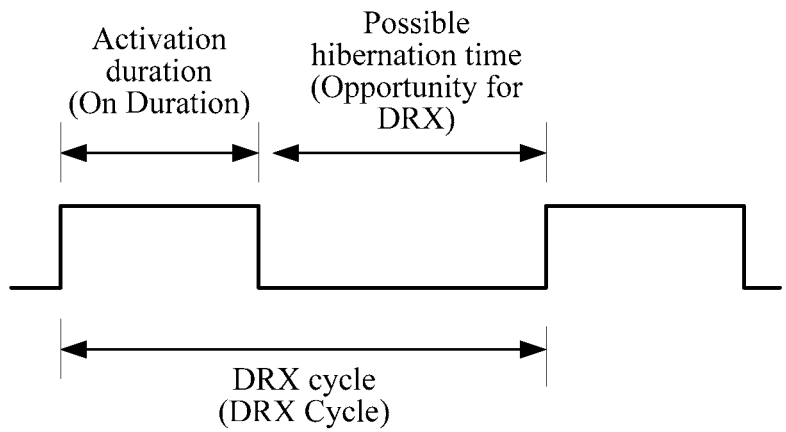
FIG. 3 is a schematic diagram of a DRX cycle.

The following details a DRX cycle with reference to FIG. 3. In a time domain, a time is divided into multiple continuous DRX cycles. A DRX cycle is used to describe a cycle in which on duration appears repeatedly in a DRX mode. A DRX cycle includes "on duration" and an "opportunity for DRX". During on duration, the user equipment monitors a physical downlink control channel (PDCCH), so as to receive downlink data. Therefore, the "on duration" may also be referred to as activation duration. The "opportunity for DRX" is a possible hibernation time. In this duration, the user equipment shuts down a receiver, and does not monitor the PDCCH or receive downlink data, so as to reduce power consumption. Therefore, the "opportunity for DRX" may also be referred to as hibernation duration.

Selecting a DRX cycle involves a balance between power consumption reduction of the user equipment and a service delay. On the one hand, a long DRX cycle is helpful for reducing power consumption of the user equipment. For example, when a user browses a downloaded web page, a resource is wasted if the user equipment continuously receives downlink data. On the other hand, when new data is transmitted, a short DRX cycle is helpful for a quicker response. For example, when a user requests a voice call or requests another web page, a short DRX cycle is helpful for the user equipment to respond to the requirement as soon as possible. Therefore, a configuration manner in which a short cycle (short DRX cycle) is combined with a long cycle (long DRX cycle) is used in a VoLTE system. Value ranges of the short DRX cycle and the long DRX cycle have been standardized in a communications protocol. The long DRX cycle is a mandatory configuration of a system, and the short DRX cycle is an optional configuration. In other words, when the system uses a long DRX cycle, a DRX cycle is the long DRX cycle, and a cycle length of the DRX cycle is a cycle length of the long DRX cycle. When the system uses a short DRX cycle, a DRX cycle is the short DRX cycle, and a cycle length of the DRX cycle is a cycle length of the short DRX cycle.

According to specifications of a current communications standard and protocol, in an LTE system, a value range of a long DRX cycle (long DRX Cycle) is SF10 (that is, 10 subframes), SF20 (that is, 20 subframes), SF32 (that is, 32 subframes), SF40 (that is, 40 subframes), SF64 (that is, 64 subframes), SF80 (that is, 80 subframes), SF128 (that is, 128 subframes), SF160 (that is, 160 subframes), SF256 (that is, 256 subframes), SF320 (that is, 320 subframes), SF512 (that is, 512 subframes), SF640 (that is, 640 subframes), SF1024 (that is, 1024 subframes), SF1280 (that is, 1280 subframes), SF2048 (that is, 2048 subframes), and SF2560 (that is, 2560 subframes). For the LTE system, one subframe is 1 millisecond (ms). For example, when a value of the long DRX cycle is SF160, the long DRX cycle occupies 160 subframes, that is, a DRX cycle length is 160 ms.

For the long DRX cycle, configuration information thereof may include a start subframe, a quantity of occupied subframes, and/or a quantity of continuous subframes during on duration that are of the long DRX cycle. After learning such configuration information, the user equipment can learn when to monitor a PDCCH channel and when to hibernate. Such information may be indicated by specifying different parameters or timers. According to the solution provided in the present invention, a cycle length value of the long DRX cycle, that is, a quantity of subframes occupied by the long DRX cycle, may be selected from possible values in the communications protocol, or may be determined according to a service QoS requirement. The start subframe and the quantity of continuous subframes occupied during the on duration that are of the long DRX cycle may be default system configurations or may be indicated by a network side to the user equipment by using different parameters or timers. In an example, the start subframe of the long DRX cycle and the quantity of subframes occupied by the long DRX cycle may be indicated by using a parameter drxStartOffset, and the quantity of continuous subframes during the on duration is indicated by using onDurationTimer.

A VoLTE technology uses a dedicated IMS access point (AP) to provide a voice service, so as to ensure relatively high quality of service (QoS) of the voice service, and uses a bearer of a specific QoS class identifier (QCI) for signaling and voice data. The QCI may indicate a resource type, a priority, a delay, a packet loss rate, and other quality requirements of a service. The QCI is transmitted between network elements of an EPS, avoiding negotiation and transmission of a large quantity of specific QoS parameters. The EPS controls the QoS according to the QCI. Service data flows (SDF) of different QCIs are mapped to different EPS bearers. QCI configuration has been standardized. The QCI includes two categories: a standard QCI and an extended QCI. The standard QCI is classified into 9 categories: QCI=1, 2, . . . , and 9. For example, IMS signaling uses a bearer of QCI=5, and this bearer is a default IMS bearer, has a highest priority, and is used to carry signaling between the user equipment and an IMS. Conversational voice uses a dedicated bearer of QCI=1. Video on-live uses a bearer of QCI=2. Real-time gaming uses a bearer of QCI=3. Buffered video streaming uses a bearer of QCI=4. Some videos having different priorities use bearers of QCI=6 to 9. The extended QCI may be set to different values according to requirements. For example, the extended QCI may be set to a value ranging from 10 to 254 according to a type of a controllable service.

The following further details the embodiments of the present invention based on the foregoing common aspects involved in the present invention.

An embodiment of the present invention provides a method for managing a DRX cycle, a base station, user equipment, a core network entity, and a system. The base station identifies current service types of the user equipment, and configures DRX cycles of different cycle lengths for the user equipment according to the different identified current service types of the user equipment. There are multiple service types of the user equipment, including a voice service (for example, a voice call and a video), a video on-live service, and the like. When the base station confirms that a delay requirement for a type of a service established by the user equipment is different from existing DRX cycle configuration of the user equipment, the base station reconfigures DRX for the user equipment to adjust the DRX cycle of the user equipment. The user equipment performs corresponding receiver on/off control according to the DRX cycle configured by the base station, so as to receive downlink data or hibernate. The adjusting the DRX cycle may include adjusting a cycle length of the DRX cycle (that is, a quantity of subframes occupied by the DRX cycle) and/or adjusting a quantity of continuous subframes during on duration of the DRX cycle. Preferably, the following provides detailed description by using an example in which the cycle length of the DRX cycle is adjusted.

Because DRX is a user equipment-level feature, conventional DRX cycle configuration is based on the user equipment, but not based on each radio bearer, that is, the conventional DRX cycle configuration does not take a current service type of the user equipment into consideration. According to the solution provided in this embodiment of the present invention, the base station can configure the DRX cycle of the user equipment flexibly, so that a better balance between power consumption reduction of the user equipment and user experience improvement can be achieved.

Figure 4:
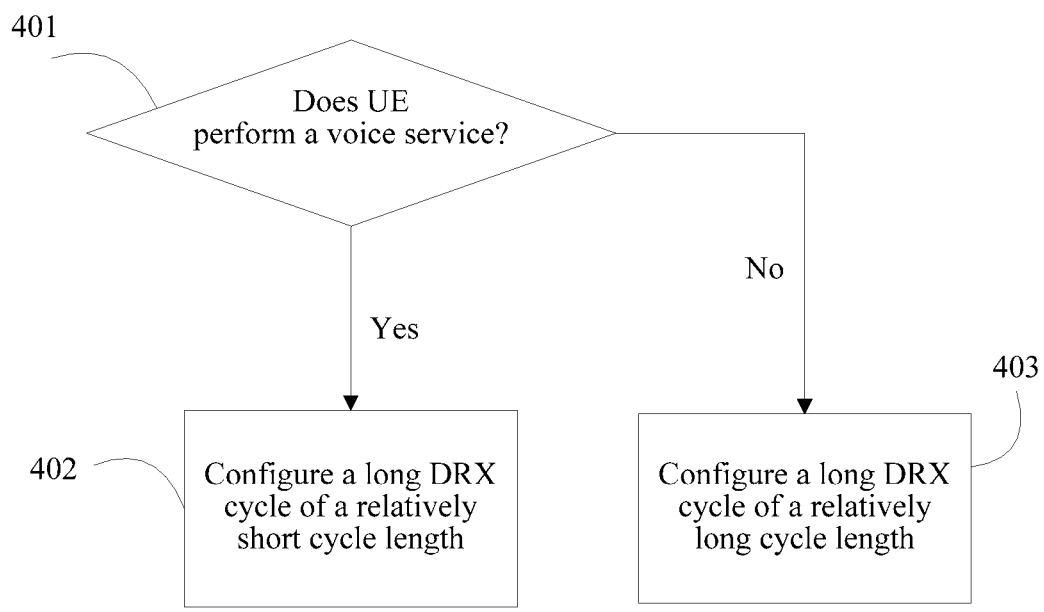
FIG. 4 is a schematic flowchart of managing a DRX cycle according to an embodiment of the present invention.

The following describes an embodiment of the present invention with reference to FIG. 4.

In section 401, a base station identifies whether a current service of a user equipment is a voice service.

In an example, the base station determines, by identifying whether the user equipment initiates a voice service, whether a current service status of the user equipment is a voice service. For example, the base station detects whether the user equipment is making a voice call, receiving a voice call, or performing a video service. If the base station identifies that the user equipment is initiating a voice call, receiving a voice call, or performing a video service, the base station identifies that the user equipment performs a voice service; otherwise, the base station identifies that the user equipment does not perform a voice service. The base station may identify a voice call initiation event of the user equipment, so as to reconfigure DRX for the user equipment as early as possible when the user equipment initiates a voice call. In this way, the user equipment can quickly respond to the voice service, thereby reducing a call delay and improving user experience.

In another example, the base station determines, by identifying whether a voice call of the user equipment ends, whether a current service of the user equipment is a voice service. For example, whether a voice service bearer (that is, a bearer of QCI=1) of the user equipment is set up or activated, or deactivated or released is detected. If the voice service bearer of the user equipment is set up or activated, it is identified that the user equipment performs a voice service. If the voice service bearer of the user equipment is deactivated or released, it is identified that the voice call of the user equipment ends, that is, the user equipment does not perform a voice service.

In section 402, if the base station identifies that the current service of the user equipment is a voice service, the base station configures a long DRX cycle of a first cycle length for the user equipment. The first cycle length may be a relatively small value in a possible value range of a long DRX cycle according to a communications standard and protocol, for example, a possible value of less than 80 subframes (for example, 20 subframes or 40 subframes). Alternatively, the first cycle length may be a value configured according to a service QoS requirement. For example, possible duration of less than 80 milliseconds (for example, 20 milliseconds or 40 milliseconds) is configured for the voice service. Because a long DRX cycle of a relatively short cycle length is configured, an interval of activation duration of the user equipment becomes shorter, and the user equipment can be scheduled more quickly to respond to the voice call more quickly, thereby greatly reducing a call setup delay of the user equipment and improving user experience.

In section 403, if the base station identifies that the user equipment does not perform a voice service, the base station configures a long DRX cycle of a second cycle length for the user equipment. The second cycle length is longer than the first cycle length. A value of the second cycle length is relatively large. The second cycle length may be a relatively large value in the possible value range of the long DRX cycle according to the communications standard and protocol, for example, a possible value of equal to or more than 80 subframes (for example, 160 subframes or 320 subframes). Alternatively, the second cycle length may be a value configured according to a service QoS requirement. For example, possible duration of equal to or more than 80 milliseconds (such as 160 milliseconds or 320 milliseconds) is configured for the voice service. Because a long DRX cycle of a relatively long cycle length is configured, the user equipment may be in hibernation as long as possible, so that power consumption is reduced.

Figure 5:
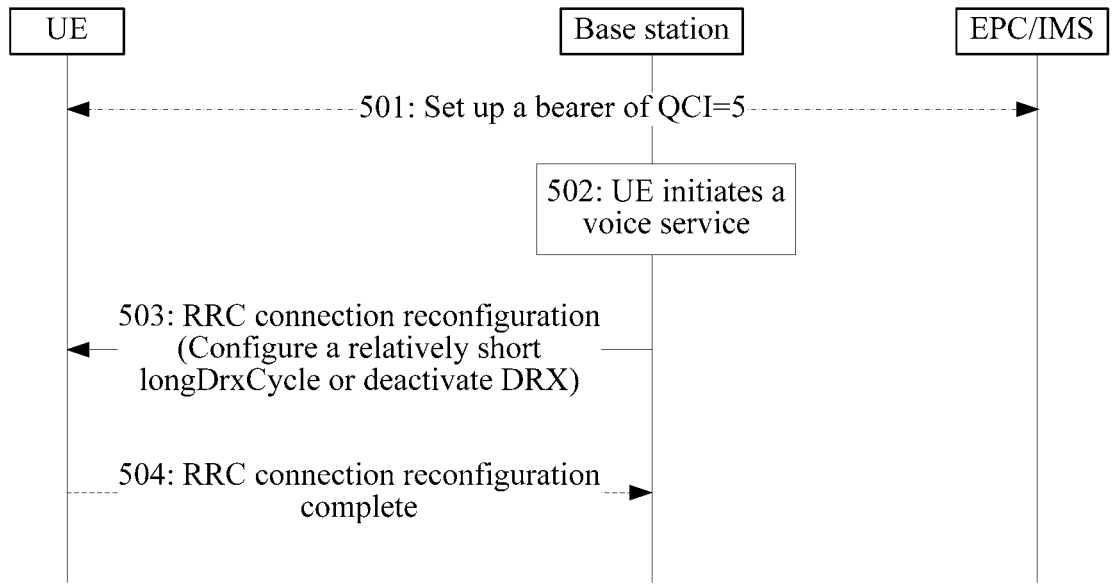
FIG. 5 is a schematic communication diagram of managing a DRX cycle according to an embodiment of the present invention.

The following further describes an embodiment of the present invention with reference to FIG. 5.

In section 501, after a user equipment supporting VoLTE is connected to a network, a corresponding bearer is set up. A bearer of QCI=5 serves as an IMS signaling bearer, has a priority higher than that of bearers of other QCI values, and is preferentially set up.

In section 502, a base station identifies that the user equipment initiates a voice service. That the user equipment initiates a voice service includes that the user equipment initiates a voice call, the user equipment responds to a voice call, the user equipment initiates a video service, or the like.

It should be noted that in related accompanying drawings provided in the present invention, for clear description, only one user equipment and a base station serving the user equipment are used as an example. It can be understood that, in different voice service procedures, the user equipment may serve as a calling party or a called party. Base stations serving the calling user equipment and the called user equipment in a voice service may be a same base station, or may be different base stations.

In this embodiment, the base station may identify, by detecting a bearer of QCI=5 (also referred to as an IMS signaling bearer), whether the user equipment initiates a voice service.

In an example, the base station parses a data packet on the bearer of QCI=5 to determine a type of a Session Initiation Protocol (SIP) message on the bearer. For example, if the base station determines, by parsing a header of the data packet, that the SIP message is an SIP invite message, the base station identifies that the user equipment initiates a voice call. For another example, if the base station determines, by means of parsing, that the SIP message is an acknowledgement response message for an SIP invite message, for example, an ACK message, the base station identifies that the user equipment responds to a voice call. As described above, the bearer of QCI=5 is used to carry signaling between the user equipment and an IMS. The bearer of QCI=5 is set up before a bearer of QCI=1 (also referred to as a conversational voice bearer) is set up. The base station identifies, by detecting the bearer of QCI=5, whether the user equipment initiates a voice service, so that the base station can more quickly identify when the user equipment initiates a voice service, thereby reducing a call or response delay.

In another example, the base station identifies, by detecting whether there is a data packet transmitted on the bearer of QCI=5, whether the user equipment initiates a voice service. If the base station detects that there is a data packet transmitted on the bearer of QCI=5, the base station identifies that the user equipment is initiating a voice call or responding to a voice call; otherwise, the base station identifies that the user equipment does not initiate a voice call or respond to a voice call. In this embodiment, the base station can identify a voice call initiation event or a voice call response event of the user equipment simply by detecting whether there is a data packet on the bearer of QCI=5, without a need to parse content of the data packet on the bearer of QCI=5. This can reduce processing complexity of the base station and reduce memory and CPU resource consumption of the base station.

In section 503, if identifying that the user equipment initiates a voice service, the base station configures a long DRX cycle of a relatively short cycle length for the user equipment, or instructs the user equipment to deactivate DRX.

In an example, the base station can send a radio resource control (RRC) message to the user equipment, to carry configuration information of the long DRX cycle. For example, the base station sends an RRC connection reconfiguration (RRC connection reconfiguration) message to the user equipment, where the message carries the configuration information of the long DRX cycle. The configuration information of the long DRX cycle includes at least a cycle length of the long DRX cycle. To reduce a call setup delay of a user and improve user experience, the base station configures the long DRX cycle of the relatively short cycle length for the user equipment. The relatively short cycle length may be configured with reference to the design described in section 402, for example, configured to 20 ms, 40 ms, 20 subframes, or 40 subframes. In an example, the base station may indicate, by using an information element drxStartOffset in the RRC connection reconfiguration message, that the long DRX cycle occupies 20 subframes.

In another example, when identifying that the user equipment initiates a voice service, the base station instructs, by sending an RRC connection reconfiguration message to the user equipment, the user equipment to deactivate the DRX. For example, an information element DRX-config in the RRC connection reconfiguration message is set to release.

In section 504, the user equipment sends an RRC connection reconfiguration complete message to the base station.

In an example, the user equipment receives the RRC connection reconfiguration message sent by the base station, performs a corresponding receiver on/off operation according to configuration information, carried in the message, of the long DRX cycle, and sends the RRC connection reconfiguration complete message to compete DRX reconfiguration. Because the base station configures the long DRX cycle of the relatively short cycle length in this case, the user equipment can enter DRX activation duration as soon as possible, thereby responding to the voice service more quickly.

In another example, after receiving a DRX deactivation instruction sent by the base station, the user equipment deactivates the DRX and enters a continuous reception working mode. In this case, the user equipment can better guarantee the voice service of the user equipment.

It should be noted that, in section 504, the step of sending the RRC connection reconfiguration complete message by the user equipment is optional. Especially for the base station, configuration at the base station side is completed after a long DRX cycle is configured for the user equipment and indicated to the user equipment. Certainly, in an embodiment, after the DRX reconfiguration is successful, the user equipment may send an RRC connection reconfiguration message to the base station. After receiving the message, the base station can know that the user equipment has completed the DRX reconfiguration successfully.

Figure 6:
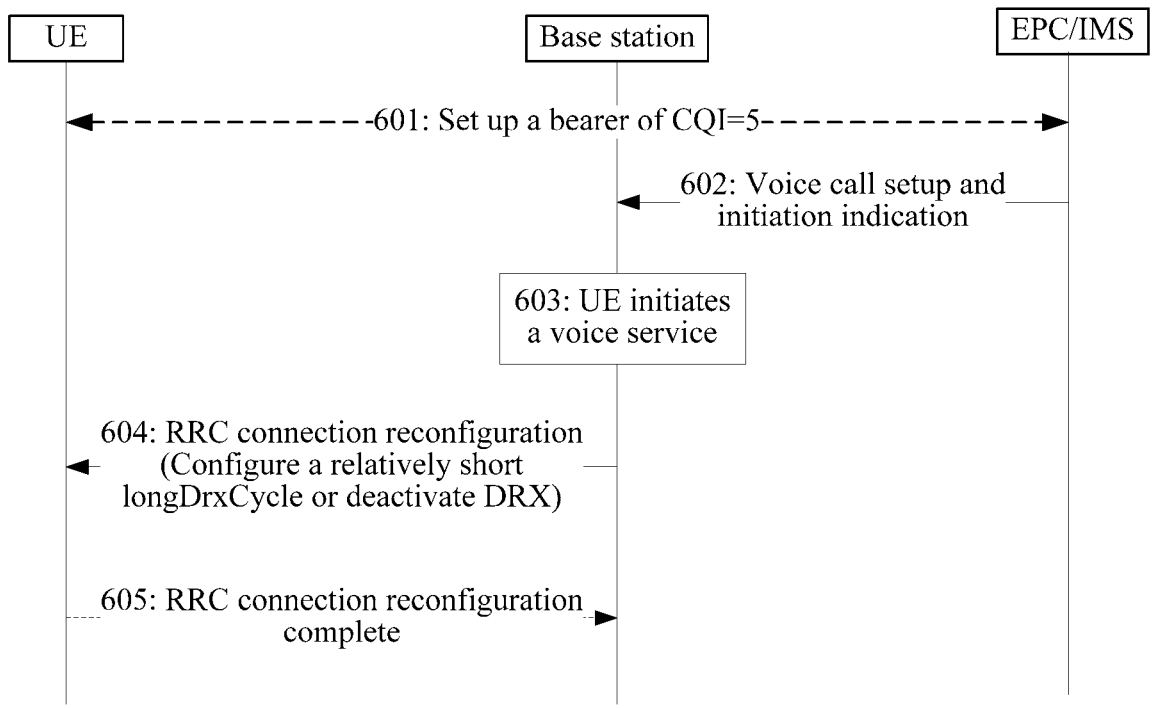
FIG. 6 is another schematic communication diagram of managing a DRX cycle according to an embodiment of the present invention.

The following further describes an embodiment of the present invention with reference to FIG. 6.

Sections 601, 604, and 605 in the embodiment provided in FIG. 6 are the same as sections 501, 503, and 504 in the embodiment provided in FIG. 5 respectively. A difference lies in that, in this embodiment, a base station learns, by receiving a notification from an EPC or IMS (EPC/IMS), that a user equipment initiates a voice service (sections 602 and 603). In an example, the notification from the EPC/IMS may be, as shown in FIG. 2, sent by an MME to the base station, or sent by an SGW and/or a PGW to the base station by using an MME, or sent by an entity in an IMS network to the base station by using an entity in an EPC network.

When a user equipment supporting VoLTE initiates a voice call, the user equipment sends an SIP message on a bearer of QCI=5, and the EPC/IMS identifies, according to content of the received SIP message, that the user equipment initiates a voice service or the user equipment is called, and notifies, in a message- or event-triggered manner, a base station serving calling user equipment or called user equipment. For example, the EPC/IMS sends a voice call setup initiation indication to the base station. The voice call setup initiation indication contains information about a voice call user and/or the user equipment, and the like. When receiving the voice call setup initiation indication, the base station identifies that the user equipment initiates a voice call or the user equipment is called, so as to determine that the user equipment initiates a voice service. The base station configures a long DRX cycle of a relatively short cycle length for the user equipment or deactivates DRX (sections 604 and 605). For specific description, reference may be made to sections 503 and 504, and details are not further described herein.

Figure 7:
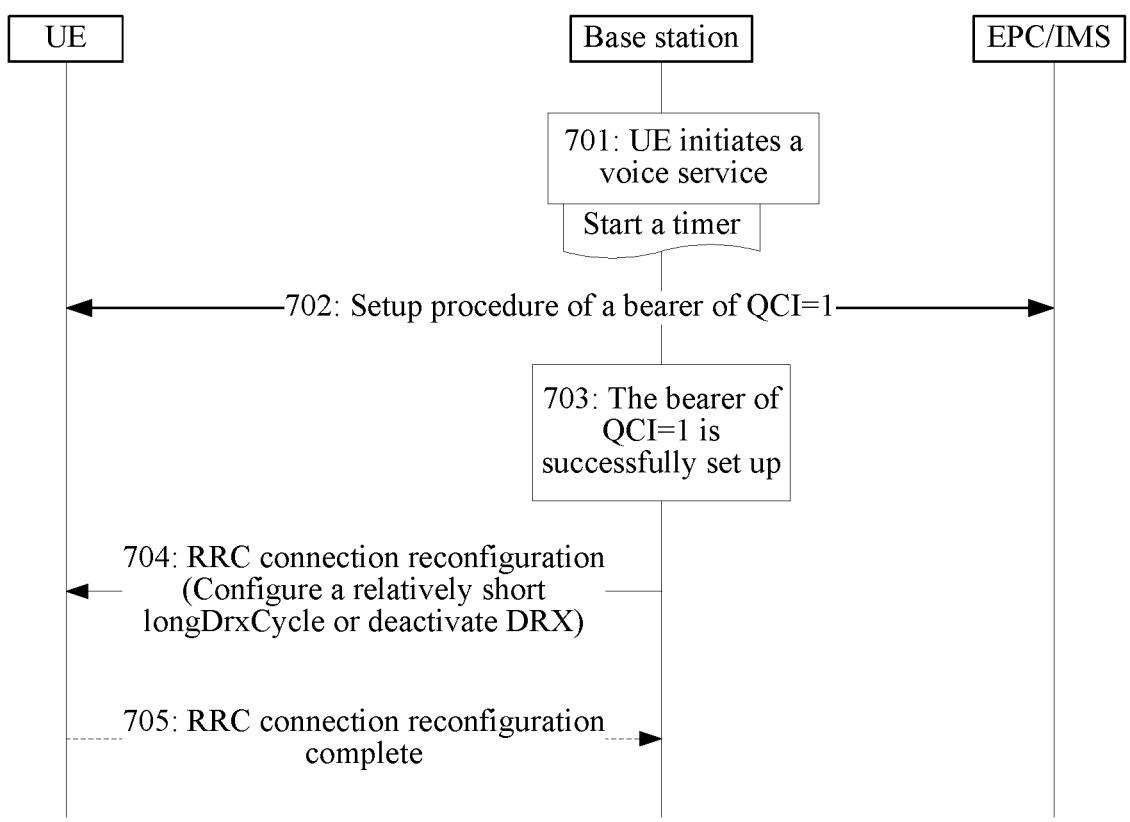
FIG. 7 is still another schematic communication diagram of managing a DRX cycle according to an embodiment of the present invention.

The following further describes an embodiment of the present invention with reference to FIG. 7.

In section 701, for a method for identifying, by a base station, that a user equipment initiates a voice service, reference may be made to the foregoing description of the embodiment in FIG. 5 or FIG. 6, and details are not further described herein. In this embodiment, when or after the base station identifies that the user equipment initiates a voice service, the base station starts a timer.

In section 703, if the base station identifies a setup procedure of a bearer of QCI=1 (section 702) when or before the timer expires, the bearer of QCI=1 is successfully set up. In an example, if a bearer setup request (for example, an E-UTRAN Radio Access Bearer (E-RAB) Setup Request) message received by the base station from a core network entity (for example, an MME) carries information about the bearer of QCI=1, the base station identifies that the bearer of QCI=1 is successfully set up. In another example, if a bearer setup response (for example, an E-RAB Setup Response) message sent by the base station to a core network entity (for example, an MME) carries information about the bearer of QCI=1 (for example, an information element E-RAB Setup list contains the information about the bearer of QCI=1), the base station identifies that the bearer of QCI=1 is successfully set up. In sections 704 and 705, the base station may perform DRX reconfiguration for the user equipment or DRX deactivation according to the foregoing solution described in the embodiment in FIG. 5 or FIG. 6, and details are not further described herein. In this embodiment, the timer is set to avoid affecting user experience due to a voice service bearer setup failure caused by a radio resource or other factors. Duration of the timer may be 2 seconds (s). Certainly, it can be understood that the timer may be set to another duration, for example, duration within 10 seconds.

Figure 8:
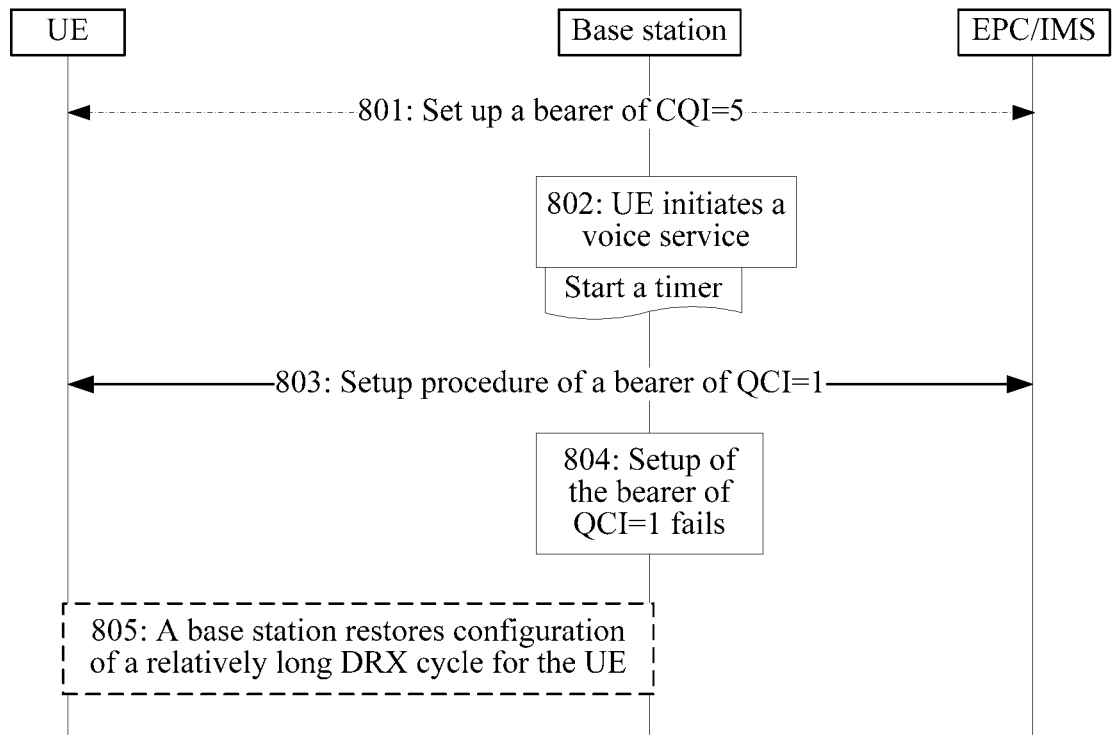
FIG. 8 is yet another schematic communication diagram of managing a DRX cycle according to an embodiment of the present invention.

The following further describes an embodiment of the present invention with reference to FIG. 8.

Sections 801 and 802 are similar to sections 701 and 702 in FIG. 7, and details are not further described herein. A difference between section 803 and section 703 is that voice service bearer setup fails. In section 804, when a timer expires, a base station identifies that setup of a bearer of QCI=1 fails.

In an example, section 805 is an optional step. The base station restores configuration of a long DRX cycle of a relatively long cycle length for a user equipment. The base station may use an RRC message to carry configuration information of the long DRX cycle. For example, reference may be made to section 403 and the description in the embodiment in FIG. 5 or FIG. 6 to complete long DRX cycle configuration for the user equipment. For example, a cycle length of the long DRX cycle may be configured to 160 milliseconds, 320 milliseconds or more, or to 160 subframes, 320 subframes or more.

In another example, when identifying that the user equipment does not perform a voice service, the base station may not perform DRX reconfiguration. In other words, the base station may not perform step 805. Generally, after the user equipment is connected to a VoLTE network, the base station configures a long DRX cycle of a relatively large value for the user equipment according to specifications of a communications protocol, for example, a possible value of 80 milliseconds or more, or 80 subframes or more. When the base station identifies that the user equipment does not perform a voice service, and a previously configured long DRX cycle has satisfied a system requirement, for example, a requirement for guaranteeing quality of service (QoS) of a service, the base station does not need to reconfigure a long DRX cycle for the user equipment. Certainly, optionally, the base station may first determine whether a long DRX cycle previously configured for the user equipment satisfies a system requirement, for example, by determining whether a cycle length of the long DRX cycle previously configured for the user equipment reaches a preset threshold. The reaching a preset threshold includes: greater than (>), greater than or equal to (≥), less than (<), less than or equal to (≤), or equal to (=) the preset threshold, or within a preset threshold range. If the long DRX cycle previously configured for the user equipment has satisfied a system requirement, the base station does not perform the DRX reconfiguration. If the long DRX cycle previously configured for the user equipment does not satisfy a system requirement, the base station performs the DRX reconfiguration for the user equipment according to the method described in sections 503 and 504, to configure a long DRX cycle satisfying the system requirement for the user equipment.

Figure 9:
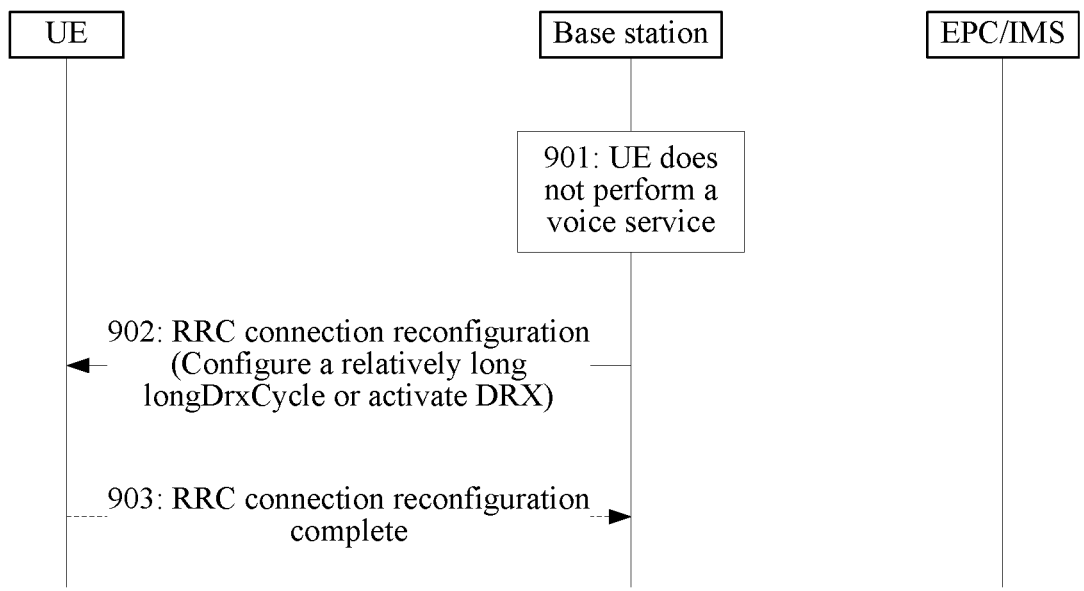
FIG. 9 is still yet another schematic communication diagram of managing a DRX cycle according to an embodiment of the present invention.

The following further describes an embodiment of the present invention with reference to FIG. 9.

In section 901, a base station identifies that a user equipment does not perform a voice service. That the user equipment does not perform a voice service includes: the user equipment does not initiate a voice call, the user equipment does not respond to a voice call, a voice call of the user equipment ends, or the like.

In an example, that the user equipment does not perform a voice service can be identified according to the method described in section 502. For example, the base station may determine, by parsing a data packet on a bearer of QCI=5, that a type of an SIP message on the bearer is not an SIP invite message or an acknowledgement response message for an SIP invite message. The base station then identifies that the user equipment does not initiate a voice call. For another example, the base station may identify, by detecting that there is no data packet transmitted on the bearer of QCI=5, that the user equipment does not initiate a voice call or respond to a voice call. For specific description, refer to section 502, and details are not further described herein.

In another example, the base station may identify, by detecting a conversational voice bearer (that is, a bearer of QCI=1), that the user equipment does not perform a voice service. For example, if the base station detects that the bearer of QCI=1 is deactivated or released, the base station identifies that a voice service of the user equipment ends.

In still another example, according to the foregoing description in the embodiment in FIG. 6, an EPC/IMS may identify that the user equipment does not perform a voice service, and notify the base station. For example, when identifying that the user equipment does not initiate a voice call or the user equipment is called, the EPC/IMS notifies, in a message- or event-triggered manner, a base station serving calling user equipment or called user equipment.

In section 902, the base station configures a long DRX cycle of a relatively long cycle length for the user equipment or instructs the user equipment to perform a DRX activation operation, so that the user equipment can reduce power consumption.

In an example, when the base station identifies that the user equipment does not perform a voice service, the base station configures the long DRX cycle of the relatively long cycle length for the user equipment. The relatively long cycle length may be configured with reference to the design described in section 403. For example, the relatively long cycle length may be configured to 80 milliseconds or 160 milliseconds, or 80 subframes or 160 subframes, or the like. For DRX reconfiguration, reference may be made to the reconfiguration procedure in section 503. For example, the base station may send an RRC connection reconfiguration message to the user equipment. The message carries configuration information of the long DRX cycle. The configuration information includes at least a cycle length of the long DRX cycle. For example, an information element drxStartOffset of the RRC connection reconfiguration message is used to indicate that the long DRX cycle occupies 160 subframes.

In another example, if when the user equipment performs a voice service, the base station instructs the user equipment to deactivate DRX, when the base station identifies that the voice service ends, the base station sends an instruction to the user equipment, instructing the user equipment to activate the DRX. Optionally, at the same time when instructing the user equipment to activate DRX, the base station may instruct the long DRX cycle of the relatively long cycle length to be configured for the user equipment. For example, the base station may set an information element DRX-config in the RRC connection reconfiguration to Setup, so as to instruct the user equipment to activate the DRX. Alternatively, the RRC connection reconfiguration message may carry both an information element DRX-config that is set to Setup, and an information element drxStartOffset that indicates the cycle length of the long DRX cycle.

Section 903 is similar to section 504 and is also an optional step. The user equipment may also perform an operation similar to section 504 to send an RRC connection reconfiguration complete message to the base station. For specific description, refer to the related description in section 504, and details are not further described herein.

The foregoing mainly describes the solutions provided in the embodiments of the present invention from a perspective of interaction between network elements. It can be understood that, to implement the foregoing functions, each network element, such as a user equipment, a base station, and a core network entity, includes a corresponding software structure and/or software module for performing each function. A person skilled in the art may be aware that, in combination with the examples described in the embodiments disclosed in this specification, units and algorithm steps may be implemented by a combination of hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 10:
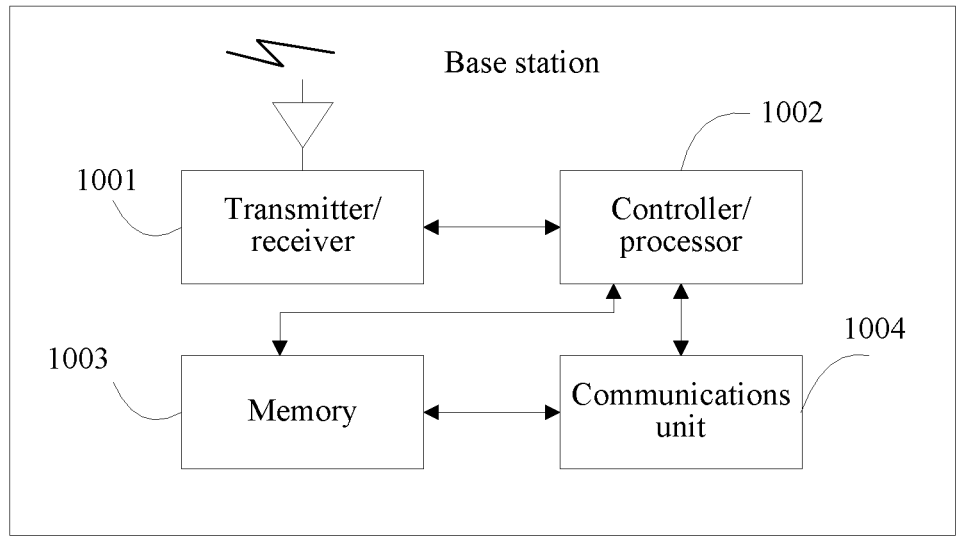
FIG. 10 is a schematic structural diagram of a base station according to an embodiment of the present invention.

FIG. 10 shows a block diagram of a design of the base station involved in the foregoing embodiments.

The base station includes a transmitter/receiver 1001, a controller/processor 1002, a memory 1003, and a communications unit 1004. The transmitter/receiver 1001 is configured to support information transmission and reception between the base station and the user equipment in the foregoing embodiments and support radio communication between the user equipment and another user equipment. The controller/processor 1002 performs various functions for communicating with the user equipment. On an uplink, an uplink signal from the user equipment is received by an antenna, modulated by the receiver 1001, and further processed by the controller/processor 1002 to restore service data and signaling message sent by the user equipment. On a downlink, service data and a signaling message are processed by the controller/processor 1002, and modulated by the transmitter 1001 to generate a downlink signal, and the downlink signal is transmitted to the user equipment by the antenna. The controller/processor 1002 further performs processing procedures involving the base station in FIG. 4 to FIG. 9 and/or other procedures for the technology described in this application. The memory 1003 is configured to store program code and data in the base station. The communications unit 1004 is configured to support the base station to communicate with other network entities, for example, configured to support the base station to communicate with other communications network entities shown in FIG. 2, such as an MME, an SGW, and/or a PGW located in a core network EPC.

It can be understood that FIG. 10 shows only a simplified design of a base station. It can be understood that, in an actual application, a base station may include any quantity of transmitters, receivers, processors, controllers, memories, communications units, and the like.

Figure 11:
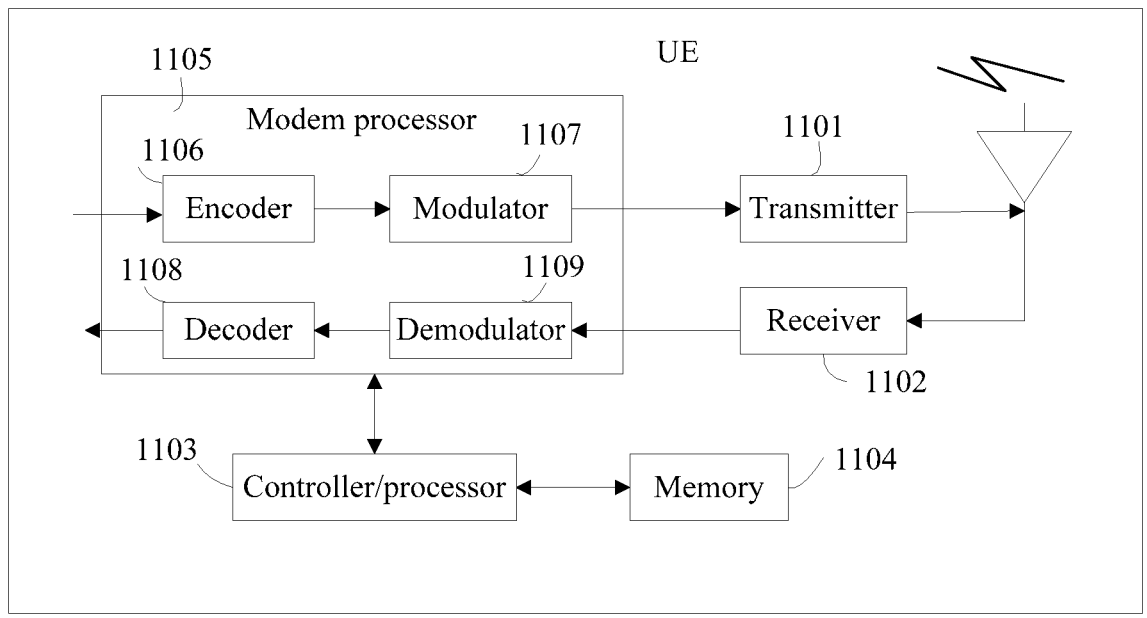
FIG. 11 is a schematic structural diagram of user equipment according to an embodiment of the present invention.

FIG. 11 shows a block diagram of a design of the user equipment involved in the foregoing embodiments.

An encoder 1106 receives service data and a signaling message to be sent on an uplink. The encoder 1106 processes (for example, formalizes, encodes, and interleaves) the service data and the signaling message. A modulator 1107 further processes the encoded service data and signaling message (for example, performs symbol mapping and modulation) and provides an output sample. A transmitter 1101 adjusts (for example, digital-analog converts, filters, amplifies, and up-converts) the output sample and generates an uplink signal. The uplink signal is transmitted by an antenna to the base station in the foregoing embodiments. On a downlink, the antenna receives a downlink signal transmitted by the base station in the foregoing embodiments. A receiver 1102 adjusts (for example, filters, amplifies, down-converts, and digitalizes) the signal received from the antenna and provides an input sample. A demodulator 1109 processes (for example, demodulates) the input sample and provides symbol estimation. A decoder 1108 processes (for example, de-interleaves and decodes) the symbol estimation and provides the decoded data and signal message to the user equipment. The encoder 1106, the modulator 1107, the demodulator 1109, and the decoder 1108 may be implemented by a modem processor 1105. These units perform processing according to a radio access technology (for example, an access technology used by an LTE system and other evolved systems) used by a radio access network.

A controller/processor 1103 controls and manages an action of the user equipment and is configured to perform processing implemented by the user equipment in the foregoing embodiments. For example, the controller/processor 1103 is configured to control the user equipment to receive paging according to a received long DRX cycle and/or complete other procedures of the technology described in the present invention. In an example, the controller/processor 1103 is configured to support the user equipment to perform procedures 501 and 504 in FIG. 5, procedures 601 and 605 in FIG. 6, procedures 702 and 705 in FIG. 7, procedures 801, 803, and 805 in FIG. 8, and procedure 903 in FIG. 9. A memory 1104 is configured to store program code and data of a user equipment 110.

Figure 12:
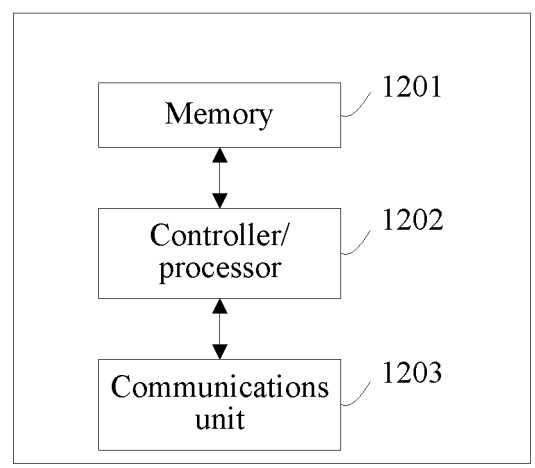
FIG. 12 is a schematic structural diagram of a core network apparatus according to an embodiment of the present invention.

FIG. 12 shows a block diagram of a design of a core network apparatus involved in the foregoing embodiments. A core network may be an EPC network, and the core network apparatus may be an MME, an SGW, a PGW, or any combination thereof.

The core network apparatus includes a controller/processor 1202, configured to control and manage an action of the core network apparatus and perform various functions to support a communications service of a user equipment. For example, the controller/processor 1202 is configured to support the core network apparatus to perform procedure 501 in FIG. 5, procedures 601 and/or 602 in FIG. 6, procedure 702 in FIG. 7, procedures 801 and 803 in FIG. 8, and/or other procedures of the technology described in this specification. A memory 1201 is configured to store program code and data of the core network apparatus. A communications unit 1203 is configured to support communication with another network entity, for example, communication with the communications unit 1004 of the base station in FIG. 10 and/or communication with the user equipment in FIG. 11. For another example, communication between network entities shown in FIG. 2 is supported.

The controller/processor configured to perform functions of the base station, the user equipment, or the core network apparatus in the present invention may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

The steps of the method or algorithm described with reference to the content disclosed in the present invention may be directly implemented by using hardware, a software module executed by a processor, or a combination thereof. The software module may be located in a random access memory (RAM), a flash memory, a read-only memory (ROM), an erasable programmable read-only memory (EPROM), an electrically erasable programmable read-only memory (EEPROM), a register, a hard disk, a portable disk, a Compact Disc Read-Only Memory (CD-ROM), or any other form of storage mediums known in the art. For example, a storage medium is coupled to a processor, so that the processor can read information from the storage medium or write information into the storage medium. Certainly, the storage medium may also be a component of the processor. The processor and the storage medium may be located in the ASIC. In addition, the ASIC may be located in user equipment. Certainly, the processor and the storage medium may exist in the user equipment as discrete components.

A person skilled in the art may aware that, in one or more of the examples, the functions described in the present invention may be implemented by using hardware, software, firmware, or any combination thereof. When implemented by using software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general purpose or dedicated computer.

In the foregoing specific implementation manners, objectives, technical solutions, and benefits of the present invention are further described in detail. It should be understood that the foregoing descriptions are merely specific exemplary implementation manners of the present invention, but are not intended to limit the protection scope of the present invention. Any modification, equivalent replacement, or improvement made based on the technical solutions of the present invention should fall within the protection scope of the present invention. Additionally, statements made herein characterizing the invention refer to an embodiment of the invention and not necessarily all embodiments.

What is claimed is:

1. A method for managing a discontinuous reception (DRX) cycle, wherein the method comprises:
   identifying, by a base station, that a user equipment initiates a voice service; and
   in response to identifying that the user equipment initiates the voice service, configuring, by the base station, a long DRX cycle for the user equipment to be a first cycle length or instructing the user equipment to deactivate DRX, wherein the first cycle length is longer than a second cycle length for the long DRX cycle, the second cycle length corresponding to the long DRX cycle for a service other than the voice service performed by the user equipment when the user equipment does not perform the voice service;
   wherein identifying that the user equipment initiates the voice service is based on:
      detecting that there is a data packet transmitted on a signaling bearer of QCI=5;
      detecting that a message sent on a signaling bearer of QCI=5 is a session initiation protocol (SIP) invite message;
      detecting that a message sent on a signaling bearer of QCI=5 is an acknowledgement response message for an SIP invite message; or
      receiving a notification from a core network or an IP multimedia subsystem (IMS), wherein the notification indicates that the user equipment initiates the voice service.

2. The method according to claim 1, further comprising:
   starting, by the base station, a timer; and
   detecting, by the base station, whether a bearer of QCI=1 is successfully set up.

3. The method according to claim 1, further comprising:
   instructing the user equipment to activate DRX when the voice service of the user equipment ends; or
   instructing the user equipment to activate DRX and configuring the long DRX cycle for the user equipment to be the second cycle length.

4. The method according to claim 1, further comprising:
   sending a radio resource control (RRC) message to the user equipment, wherein the RRC message carries one or more of the following information: the first cycle length, the second cycle length, an instruction for instructing the user equipment to deactivate DRX, and/or an instruction for instructing the user equipment to activate DRX.

5. A base station, comprising:
   at least one processor, configured to:
      configure a long discontinuous reception (DRX) cycle for a user equipment to be a first cycle length or instruct the user equipment to deactivate DRX in case the user equipment is identified as initiating a voice service; and
      configure the long DRX cycle for the user equipment to be a second cycle length for a service other than the voice service in case the user equipment is identified as not performing the voice service, wherein the first cycle length is shorter than the second cycle length; and
   a transmitter, configured to send the first cycle length, the second cycle length, or an instruction for instructing the user equipment to deactivate DRX;
   wherein the at least one processor is configured to identify that the user equipment initiates the voice service based on:
      detecting that there is a data packet transmitted on a signaling bearer of QCI=5;
      detecting that a message sent on a signaling bearer of QCI=5 is a session initiation protocol (SIP) invite message;
      detecting that a message sent on a signaling bearer of QCI=5 is an acknowledgement response message for an SIP invite message; and/or
      receiving a notification from a core network or an IP multimedia subsystem (IMS), wherein the notification indicates that the user equipment initiates the voice service.

6. The base station according to claim 5, wherein the at least one processor is further configured to: start a timer; and detect whether a bearer of QCI=1 is successfully set up before the timer expires.

7. The base station according to claim 5, wherein the at least one processor is further configured to identify that the user equipment does not perform the voice service based on:
   detecting that there is no data packet transmitted on a signaling bearer of QCI=5;
   detecting that a message sent on a signaling bearer of QCI=5 is not an SIP invite message or an acknowledgement response message for an SIP invite message;
   detecting that a bearer of QCI=1 is deactivated or released; and/or
   receiving a notification from a core network or an IMS, wherein the notification indicates that the user equipment does not perform the voice service.

8. The base station according to claim 5, wherein the at least one processor is further configured to:
   instruct the user equipment to activate DRX when the voice service of the user equipment ends; or
   instruct the user equipment to activate DRX and configure the long DRX cycle for the user equipment to be the second cycle length.

9. The base station according to claim 5, wherein the transmitter is further configured to send a radio resource control (RRC) message to the user equipment, wherein the RRC message carries one or more of the following information: the first cycle length, the second cycle length, an instruction for instructing the user equipment to deactivate DRX, and/or an instruction for instructing the user equipment to activate DRX.

10. A communications system, comprising:
    a base station; and
    a user equipment;
    wherein the base station is configured to:
       configure a long discontinuous reception (DRX) cycle for the user equipment to be a first cycle length or instruct the user equipment to deactivate DRX in case the user equipment is identified as initiating a voice service;
       configure the long DRX cycle for the user equipment to be a second cycle length for a service other than the voice service in case the user equipment is identified as not performing the voice service, wherein the first cycle length is shorter than the second cycle length; and
       send the first cycle length, the second cycle length, or an instruction for instructing the user equipment to deactivate DRX; and wherein the user equipment is configured to receive paging according to the first cycle length, the DRX deactivation instruction, or the second cycle length;

wherein the base station is configured to identify that the user equipment initiates the voice service based on:
- detecting that there is a data packet transmitted on a signaling bearer of QCI=5;
- detecting that a message sent on a signaling bearer of QCI=5 is a session initiation protocol (SIP) invite message;
- detecting that a message sent on a signaling bearer of QCI=5 is an acknowledgement response message for an SIP invite message; and/or
- receiving a notification from a core network or an IP multimedia subsystem (IMS), wherein the notification indicates that the user equipment initiates the voice service.

11. The communications system according to claim 10, wherein the base station is further configured to start a timer and detect whether a bearer of QCI=1 is successfully set up before the timer expires.

12. The communications system according to claim 10, wherein the base station is configured to identify that the user equipment does not perform the voice service based on:
- detecting that there is no data packet transmitted on a signaling bearer of QCI=5;
- detecting that a message sent on a signaling bearer of QCI=5 is not an SIP invite message or an acknowledgement response message for an SIP invite message;
- detecting that a bearer of QCI=1 is deactivated or released; and/or
- receiving a notification from a core network or an IMS, wherein the notification indicates that the user equipment does not perform the voice service.

13. The communications system according to claim 10, wherein the base station is further configured to send a radio resource control (RRC) message to the user equipment, wherein the RRC message carries one or more of the following information: the first cycle length, the second cycle length, an instruction for instructing the user equipment to deactivate DRX, and/or an instruction for instructing the user equipment to activate DRX.

14. The system according to claim 10, further comprising:
- a core network entity, wherein the core network entity is configured to notify the base station when it is detected that the user equipment does not perform the voice service or performs the voice service.

* * * * *